(12) United States Patent
Wilenski et al.

(10) Patent No.: US 9,862,828 B2
(45) Date of Patent: Jan. 9, 2018

(54) POLYMER NANOPARTICLE ADDITIONS FOR RESIN MODIFICATION

(71) Applicant: The Boeing Company, Chicago, IL (US)

(72) Inventors: Mark S. Wilenski, Mercer Island, WA (US); Samuel J. Meure, Fishermans Bend (AU)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 14/493,365

(22) Filed: Sep. 23, 2014

(65) Prior Publication Data

US 2016/0083583 A1 Mar. 24, 2016

(51) Int. Cl.

| C08L 23/00 | (2006.01) |
|---|---|
| C08L 83/04 | (2006.01) |
| C08L 33/00 | (2006.01) |
| C08L 77/00 | (2006.01) |
| C08L 67/00 | (2006.01) |
| C08L 69/00 | (2006.01) |
| C08L 75/04 | (2006.01) |
| C08L 71/00 | (2006.01) |
| C08L 79/08 | (2006.01) |
| C08L 81/06 | (2006.01) |
| C08L 79/02 | (2006.01) |
| C08L 79/04 | (2006.01) |
| C08L 39/04 | (2006.01) |
| C08L 63/00 | (2006.01) |
| C08J 5/00 | (2006.01) |
| C08J 5/24 | (2006.01) |
| C08J 5/10 | (2006.01) |

(52) U.S. Cl.
CPC ............... *C08L 83/04* (2013.01); *C08J 5/005* (2013.01); *C08J 5/10* (2013.01); *C08J 5/24* (2013.01); *C08L 23/00* (2013.01); *C08L 33/00* (2013.01); *C08L 39/04* (2013.01); *C08L 63/00* (2013.01); *C08L 67/00* (2013.01); *C08L 69/00* (2013.01); *C08L 71/00* (2013.01); *C08L 75/04* (2013.01); *C08L 77/00* (2013.01); *C08L 79/02* (2013.01); *C08L 79/04* (2013.01); *C08L 79/08* (2013.01); *C08L 81/06* (2013.01); *C08J 2300/22* (2013.01); *C08J 2300/24* (2013.01); *C08J 2400/22* (2013.01); *C08J 2400/24* (2013.01)

(58) Field of Classification Search
CPC .......... C08L 23/00; C08L 67/00; C08L 69/00; C08L 71/00; C08L 77/00; C08L 79/08; C08L 81/06; C08L 83/04
USPC ........ 523/201, 222; 525/418, 420, 453, 462, 525/471, 474, 50, 523, 534, 535, 540, 55
See application file for complete search history.

(56) References Cited

U.S. PATENT DOCUMENTS

| 3,860,565 | A | 1/1975 | Barber, Jr. |
|---|---|---|---|
| 3,943,090 | A | 3/1976 | Enever |
| 4,306,040 | A | 12/1981 | Baer |
| 4,861,803 | A | 8/1989 | Turner |
| 5,028,478 | A | 7/1991 | Odagiri et al. |
| 5,589,523 | A | 12/1996 | Sawaoka et al. |
| 5,605,745 | A | 2/1997 | Recker et al. |
| 5,618,857 | A | 4/1997 | Newberth |
| 6,503,856 | B1 | 1/2003 | Broadway et al. |
| 6,508,897 | B1 | 1/2003 | Yamaguchi |
| 6,518,330 | B2 | 2/2003 | White et al. |
| 6,740,185 | B2 | 5/2004 | Baldwin |
| 7,037,865 | B1 | 5/2006 | Kimberly |
| 7,122,250 | B2 | 10/2006 | Kinsho et al. |
| 7,435,693 | B2 | 10/2008 | Tsotsis et al. |
| 7,645,402 | B2 | 1/2010 | Choi et al. |
| 7,655,295 | B2 | 2/2010 | Smith et al. |
| 7,678,847 | B2 | 3/2010 | Yan et al. |
| 7,738,763 | B2 | 6/2010 | Ouderkirk |
| 7,910,636 | B2 | 3/2011 | Barker |
| 8,080,313 | B2 | 12/2011 | Bonneau et al. |
| 8,088,470 | B2 | 1/2012 | Dolby |
| 8,101,106 | B2 | 1/2012 | Ellis |
| 8,283,404 | B2 | 10/2012 | Allen |
| 8,288,453 | B2 | 10/2012 | Hsu et al. |
| 8,519,505 | B2 | 8/2013 | Hiroshige et al. |
| 8,703,630 | B2 | 4/2014 | LoFaro et al. |
| 2002/0119331 | A1 | 8/2002 | Jiang |
| 2003/0174994 | A1 | 9/2003 | Garito et al. |
| 2005/0070666 | A1 | 3/2005 | Martin |
| 2005/0255236 | A1 | 11/2005 | Deng |
| 2006/0057355 | A1 | 3/2006 | Suzuki et al. |

(Continued)

FOREIGN PATENT DOCUMENTS

| CN | 101623266 A | 1/2010 |
|---|---|---|
| CN | 202878879 U | 4/2013 |

(Continued)

OTHER PUBLICATIONS

Hackett et al., "The Effect of Nanosilica Concentration on the Enhancement of Epoxy Matrix Resins for Prepreg Composites," Society for the Advencement of Material and Process Engineering, 2010.

(Continued)

*Primary Examiner* — Edward J Cain

(57) ABSTRACT

A composition may include a resin and a plurality of polymer nanoparticles included in the resin to form a resin mixture. The polymer nanoparticles may alter the properties of the resin mixture and improve the processing, manufacturability, and performance of an article manufactured with the polymer nanoparticles.

20 Claims, 12 Drawing Sheets

(56) References Cited

U.S. PATENT DOCUMENTS

| | | |
|---|---|---|
| 2006/0269738 A1 | 11/2006 | Kimberly |
| 2007/0248827 A1 | 10/2007 | Rukavina |
| 2008/0176987 A1 | 7/2008 | Trevet et al. |
| 2009/0130376 A1 | 5/2009 | Berkel et al. |
| 2009/0004460 A1 | 6/2009 | Gruber |
| 2009/0326137 A1 | 12/2009 | Hsu et al. |
| 2010/0249277 A1 | 9/2010 | Fang |
| 2010/0273382 A1 | 10/2010 | Nandi |
| 2010/0304119 A1 | 12/2010 | Bonneau |
| 2011/0021360 A1 | 1/2011 | Al-Ghamdi |
| 2011/0028308 A1 | 2/2011 | Shah et al. |
| 2012/0064283 A1 | 3/2012 | Hill et al. |
| 2013/0029574 A1 | 1/2013 | Van Der Steen et al. |
| 2013/0161502 A1 | 7/2013 | Wilson |
| 2013/0167502 A1 | 7/2013 | Wilson et al. |
| 2013/0221285 A1 | 8/2013 | Song et al. |
| 2014/0038481 A1 | 2/2014 | Chen |
| 2014/0076198 A1 | 3/2014 | Kim et al. |
| 2014/0295723 A1 | 10/2014 | Nelson |
| 2015/0252184 A1* | 9/2015 | Arai .......................... C08J 5/24 523/434 |
| 2015/0259493 A1 | 9/2015 | Nederkoom |
| 2016/0300810 A1 | 10/2016 | Kanamori |

FOREIGN PATENT DOCUMENTS

| | | | |
|---|---|---|---|
| EP | 0378854 | | 7/1990 |
| EP | 1066224 | | 12/2001 |
| EP | 2236549 A1 | | 10/2010 |
| EP | 2886590 A1 | | 6/2015 |
| WO | WO9921697 | | 5/1999 |
| WO | WO 2014050264 | * | 3/2014 |
| WO | WO2014074767 A1 | | 5/2014 |
| WO | WO2015097283 | | 7/2015 |

OTHER PUBLICATIONS

Nagavarma et al., "Different Techniques for Preparation of Polymeric Nanoparticles—A Review," Asian Journal of Pharmaceutical and Clinical Research, vol. 5, Suppl 3, 2012.

European Search Report for EP15186490, dated Jan. 22, 2016.

Sober, D.J., "Kaneka Core-Shell Toughening Systems for Thermosetting Resins," 2007.

Suzuki, M.; Nagai, A.; Suzuki, M., Takahashi, A.: "Relationship between Structure and Mechanical Property for Bismaleimide-Biscyanamide resin," 1992. J. App. Poly. Sci, 45, pp. 177-180.

Fan, H.; Lei, Z.; Pan, J.H.; Zhao, X.S., "Sol-gel synthesis, microstructure and adsorption properties of hollow silica spheres," Materials Letters 65 (2011), 1811-1814.

Hydro, et al., Journal of Polymer Science: Part B: Polymer Physics, 45,1470-1481 (2007).

Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.

European Search Report for EP15186490.7, dated May 2, 2017.

European Search Report for EP15186490, dated Nov. 6, 2017

Malvern, "A basic guide to particle characterization," 2015.

* cited by examiner

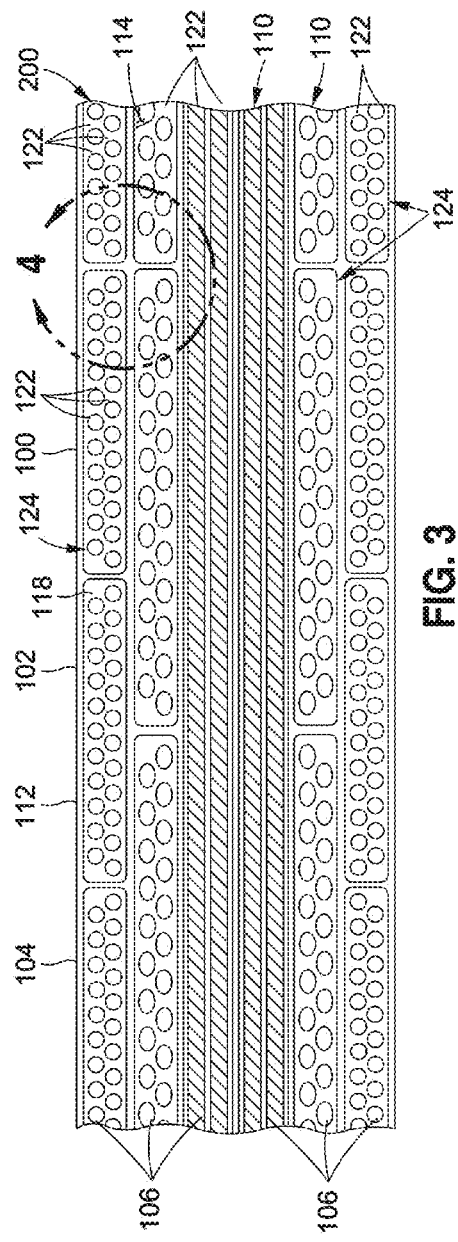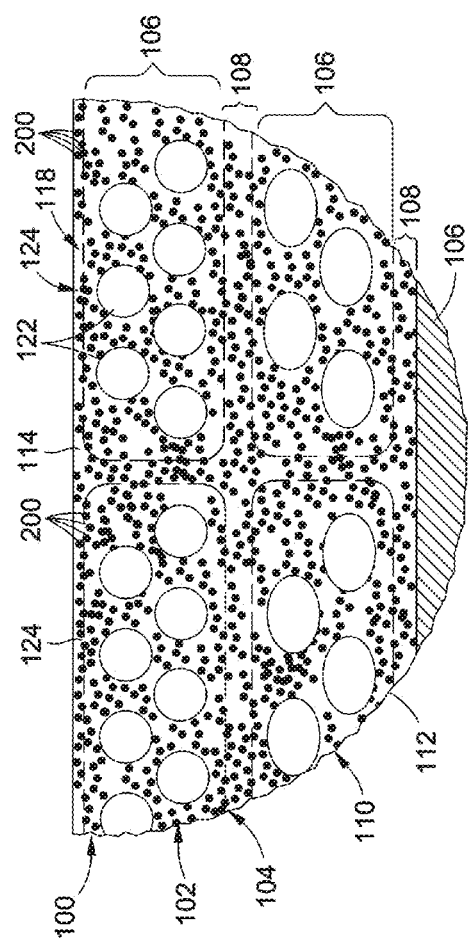

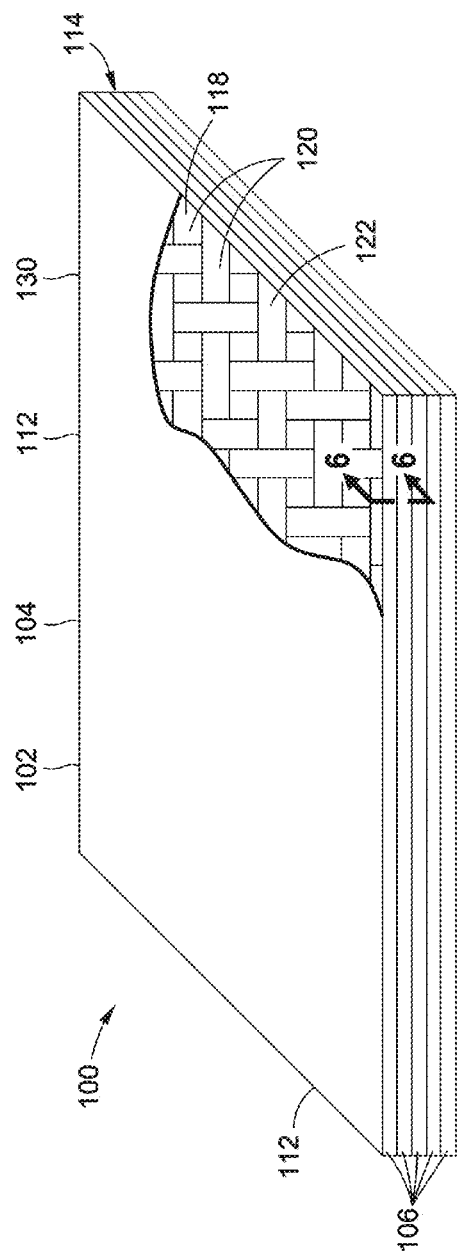
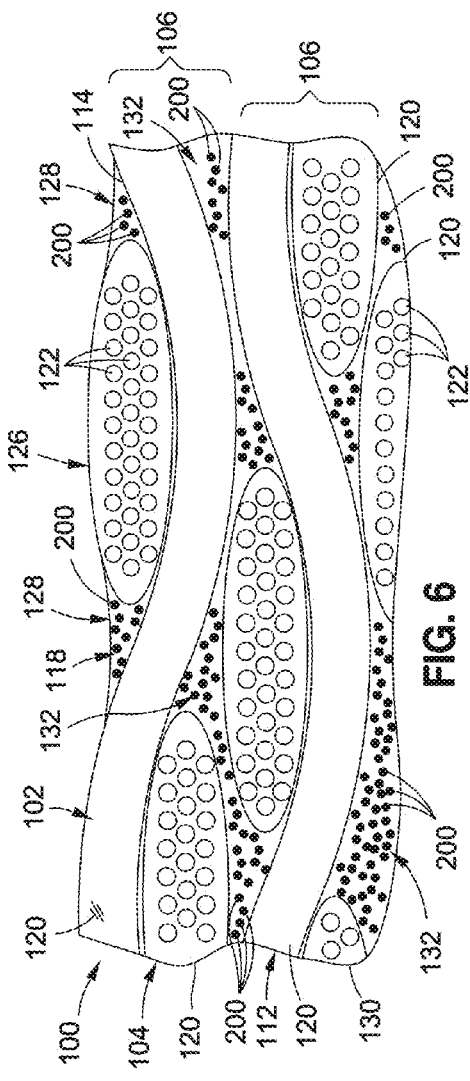

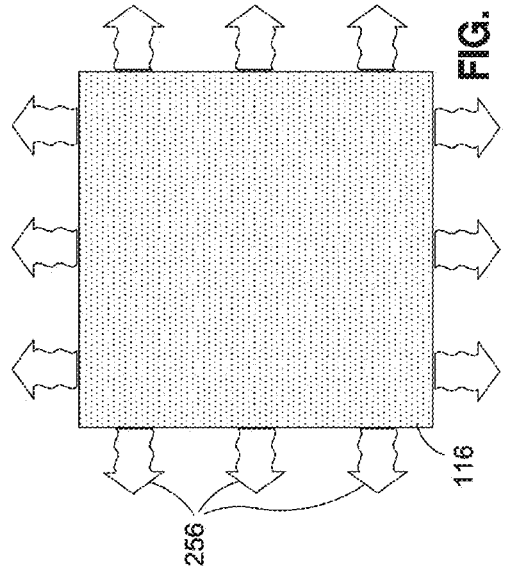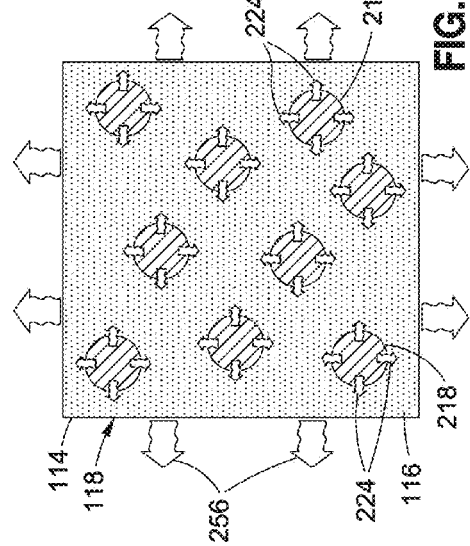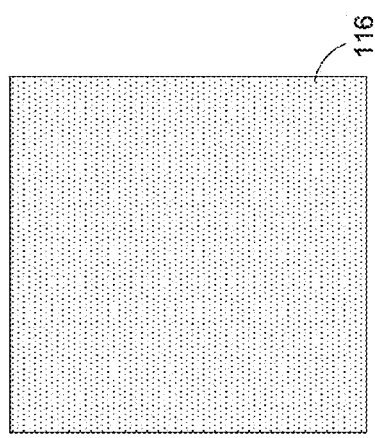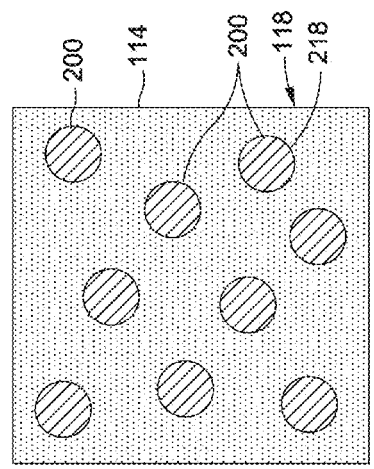

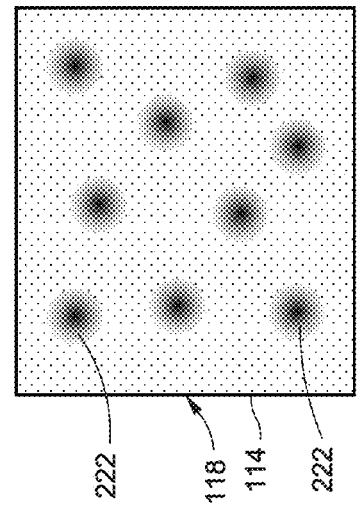
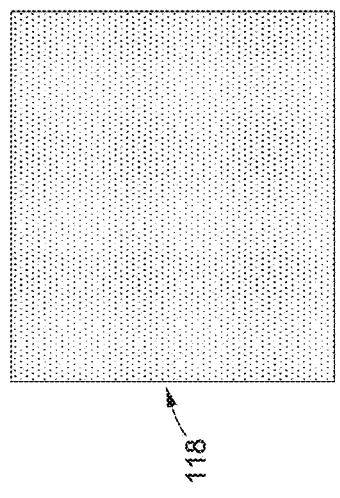
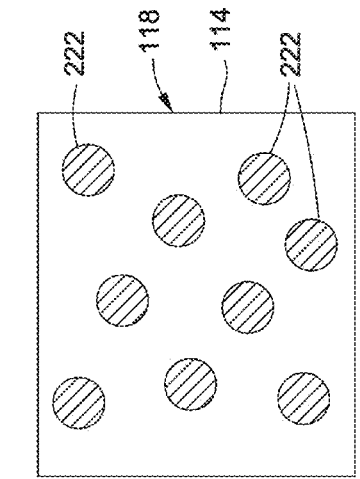
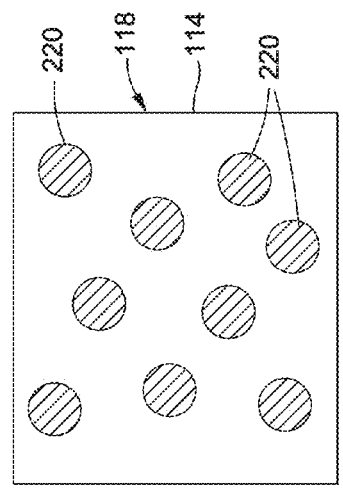

POLYMER NANOPARTICLE ADDITIONS
FOR RESIN MODIFICATION

FIELD

The present disclosure relates generally to composite materials and, more particularly, to the incorporation of nanoparticles in a composite layup to alter the properties of the composite structure.

BACKGROUND

The manufacturing of a composite structure may include applying uncured resin to reinforcing fibers of a composite layup. The temperature of the composite layup may be increased to reduce the viscosity of the resin so that the resin may flow and infuse the fibers. The composite layup may be held at an elevated temperature for a predetermined period of time to cure the resin into a solidified or hardened state. After the resin has cured, the composite structure may be passively or actively cooled to ambient temperature.

In many composite material systems, the resin may have a coefficient of thermal expansion (CTE) that may be different than the CTE of the reinforcing fibers. For example, epoxy resins may have a CTE that may be an order of magnitude greater than the CTE of carbon fibers. The difference in CTE may result in the resin and fibers contracting by different amounts as the composite structure cools down from the curing temperature. The difference in contraction of the resin relative to the fibers may result in thermally-induced stresses in the resin. The thermally-induced stresses may result in undesirable cracking or microcracking in the resin. Microcracking may also occur during the service life of a composite structure due to changes in temperature of the operating environment of the composite structure.

Prior art attempts to reduce or prevent microcracking include the addition of tougheners to liquid resin. Conventional thermoset resins may be formed using liquid polymers to form an uncured liquid resin. Alternatively, solid polymers may be dissolved into liquids during mixing to form an uncured liquid resin. Tougheners in liquid form may be added to the uncured liquid resin to improve the resistance of the resin to microcracking Unfortunately, adding liquid tougheners to resin may result in a reduction in the final resin glass transition temperature during curing, or the liquid tougheners may increase the cure temperature of the resin and/or cause excessive cure shrinkage of the resin. In addition, tougheners often increase the viscosity of the resin which may impair manufacturability and thus effectively limit the amount of toughener that can be added to the resin. Advanced thermoset resins typically require relatively high cure temperatures (e.g., 350-600° F.) to fully cure the thermoset resin/composite. Such high cure temperatures may result in increased thermally-induced stresses and strains due to the differential CTE between the fibers and the resin.

As can be seen, there exists a need in the art for a system and method for improving the properties of a resin such as resin toughness, and which avoids one or more undesirable characteristics including, but not limited to, high heat of reaction, high cure temperatures, and excessive cure shrinkage of the resin.

SUMMARY

The above-noted needs associated with composite structures are specifically addressed by the present disclosure which provides a composition. The composition may include a resin and a plurality of polymer nanoparticles included in the resin to form a resin mixture. The polymer nanoparticles may alter the properties of the resin mixture and improve the processing, manufacturability, and performance of an article manufactured with the polymer nanoparticles.

Also disclosed is a composite structure which may include a resin and solidified polymer nanoparticles included in the resin to from a resin mixture. Reinforcing fibers may be embedded within the resin mixture.

In addition, disclosed is a method of forming a composition. The method may include the steps of providing a resin, at least partially curing or solidifying a plurality of polymer nanoparticles, and mixing the plurality of polymer nanoparticles with the resin to form a resin mixture. The method may additionally include curing the resin mixture to form a composite structure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 shows a cross-section of a portion of a composite structure showing reinforcing filaments of the unidirectional composite plies oriented at different angles;

FIG. 4 is an enlarged view of a portion of the composite structure taken along line 4 of FIG. 3 and showing a plurality of polymer nanoparticles in the resin;

FIG. 5 is a perspective view of a composite structure including a stack of composite plies of woven fabric;

FIG. 6 is a sectional view of a portion of a composite structure taken along line 6 of FIG. 5 and showing polymer nanoparticles placed in divots and/or intersections of the fiber tows of the woven fabric;

FIG. 15 is a schematic illustration of a uncured unmodified resin with no polymer nanoparticles in the unmodified resin;

FIG. 15A is a schematic illustration of the heat of reaction generated by the unmodified resin during curing;

FIG. 16 is a schematic illustration of an uncured resin mixture containing a plurality of at least partially cured polymer nanoparticles;

FIG. 16A is a schematic illustration of the partially cured polymer nanoparticles absorbing a portion of the resin heat of reaction during curing of the resin mixture of FIG. 16;

FIG. 17 is a schematic illustration of an uncured resin mixture containing a plurality of soluble polymer nanoparticles;

FIG. 17A is a schematic illustration of the dissolution of the soluble polymer nanoparticles into the resin such as during curing of the resin mixture of FIG. 17;

FIG. 18 is a schematic illustration of an uncured resin mixture containing a plurality of partially soluble nanoparticles;

FIG. 18A is a schematic illustration of the partial dissolution of the partially soluble polymer nanoparticles during curing of the resin mixture of FIG. 18;

DETAILED DESCRIPTION

Figure 1:
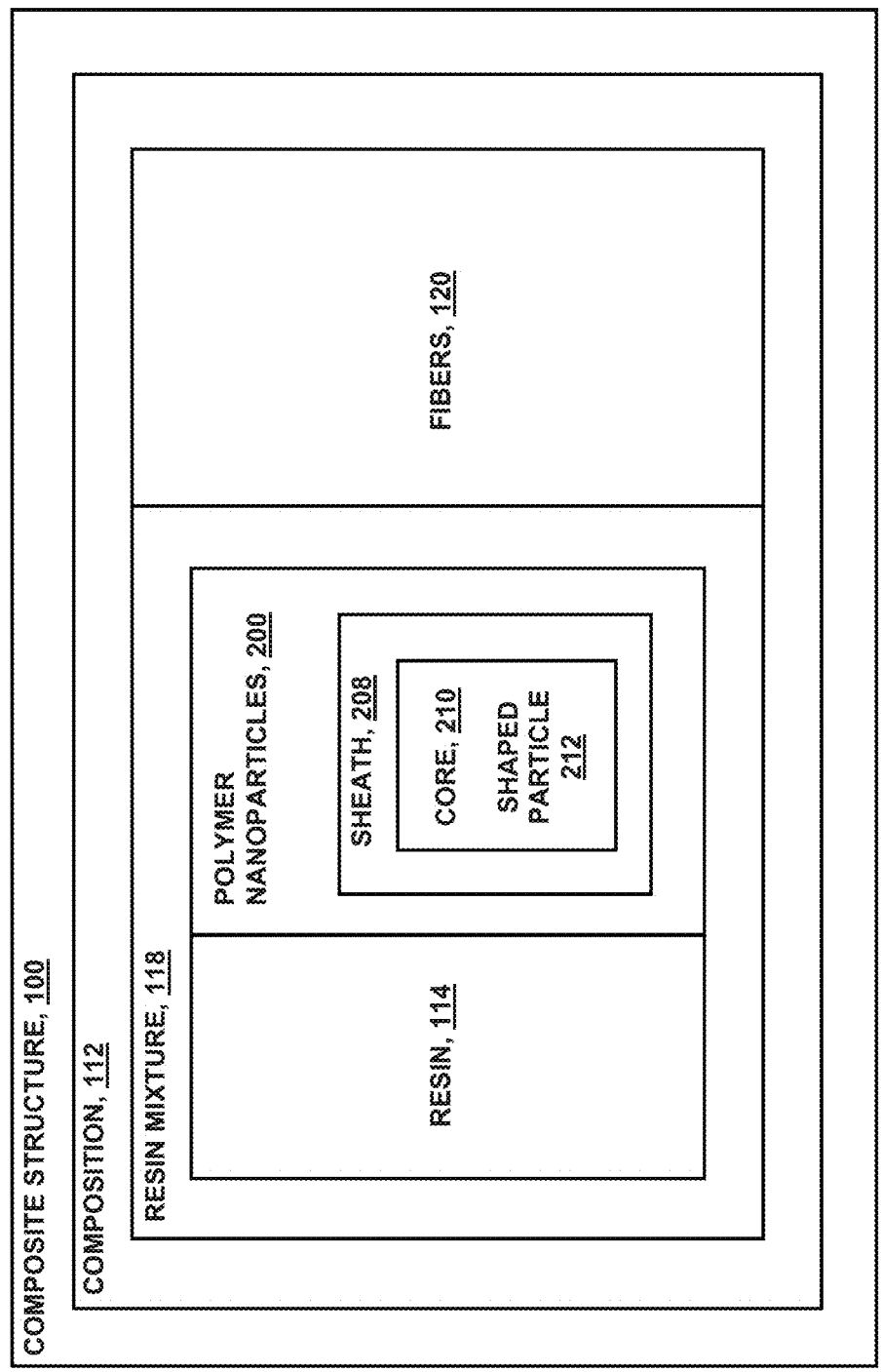
FIG. 1 is a block diagram of a composite structure including reinforcing fibers and a resin mixture comprising resin containing polymer nanoparticles.

Referring now to the drawings wherein the showings are for purposes of illustrating various embodiments of the disclosure, shown in FIG. 1 is a block diagram of a composite structure 100. The composite structure 100 may include a composition 112 (FIG. 2) of a resin mixture 118 and reinforcing fibers 120 (FIG. 2) embedded within the resin mixture 118. The resin mixture 118 may include resin 114 containing a plurality of polymer nanoparticles 200. The polymer nanoparticles 200 may be a least partially solidified and/or pre-cured prior to curing the resin 114 which may ensure stability of the polymer nanoparticles 200 in the resin 114. In some examples, polymer nanoparticles 200 that are partially pre-cured prior to mixing with the resin 114 may be post-cured during the resin curing or solidification cycle. Polymer nanoparticles 200 may be added to thermosetting resins and to thermoplastic resins to tailor the properties of the resin. Advantageously, the polymer nanoparticles 200 may be provided in a broad spectrum of materials which may facilitate the ability to tailor a wide range or resin properties over a wide range of property values.

For example, the addition of polymer nanoparticles 200 may reduce the coefficient of thermal expansion (CTE) differential between the reinforcing fibers 120 and the resin 114. The addition of polymer nanoparticles 200 (FIG. 1) may also provide increased toughness, increased flammability resistance, increased electrical conductivity, reduced cure-shrinkage-related distortion, reduced heat-of-reaction-related distortion, reduced heat-of-reaction-related resin degradation, and provide other improvements. Some improvements may have the effect of reducing or preventing thermally-induced internal stresses in the resin 114 (FIG. 1) which may otherwise result in microcracking of the resin 114. In some examples, the addition of polymer nanoparticles 200 to the resin 114 may alter the modulus of elasticity, improve the strength and/or strain properties, improve the electrical conductivity, corrosion resistance, and the flammability, smoke, and/or toxicity characteristics of a composite structure 100.

Advantageously, the relatively small size and/or generally rounded or spherical shape of the polymer nanoparticles 200 may allow the resin mixture 118 to retain a relatively low viscosity during processing at relatively high load levels of polymer nanoparticles 200 in the resin 114. A relatively low viscosity of the resin mixture 118 (FIG. 1) may facilitate resin flow into and through the reinforcing fibers 120 (FIG. 2) for faster and more reliable processing. Although the present disclosure describes the implementation of polymer nanoparticles 200 (FIG. 1) in a resin mixture 118 for a composite structure 100, the resin mixture 118 of polymer nanoparticles 200 in resin 114 may be implemented in other applications including, but not limited to, adhesives, coatings, and any one of a variety of other applications. The polymer nanoparticles 200 may be added to thermosetting resins and to thermoplastic resins for both prepreg and resin infusion systems. The polymer nanoparticles 200 may be added to tailor the properties of the resin 114 and improve the processing, manufacturability, and performance of an article manufactured with resin containing polymer nanoparticles 200.

Figure 2:
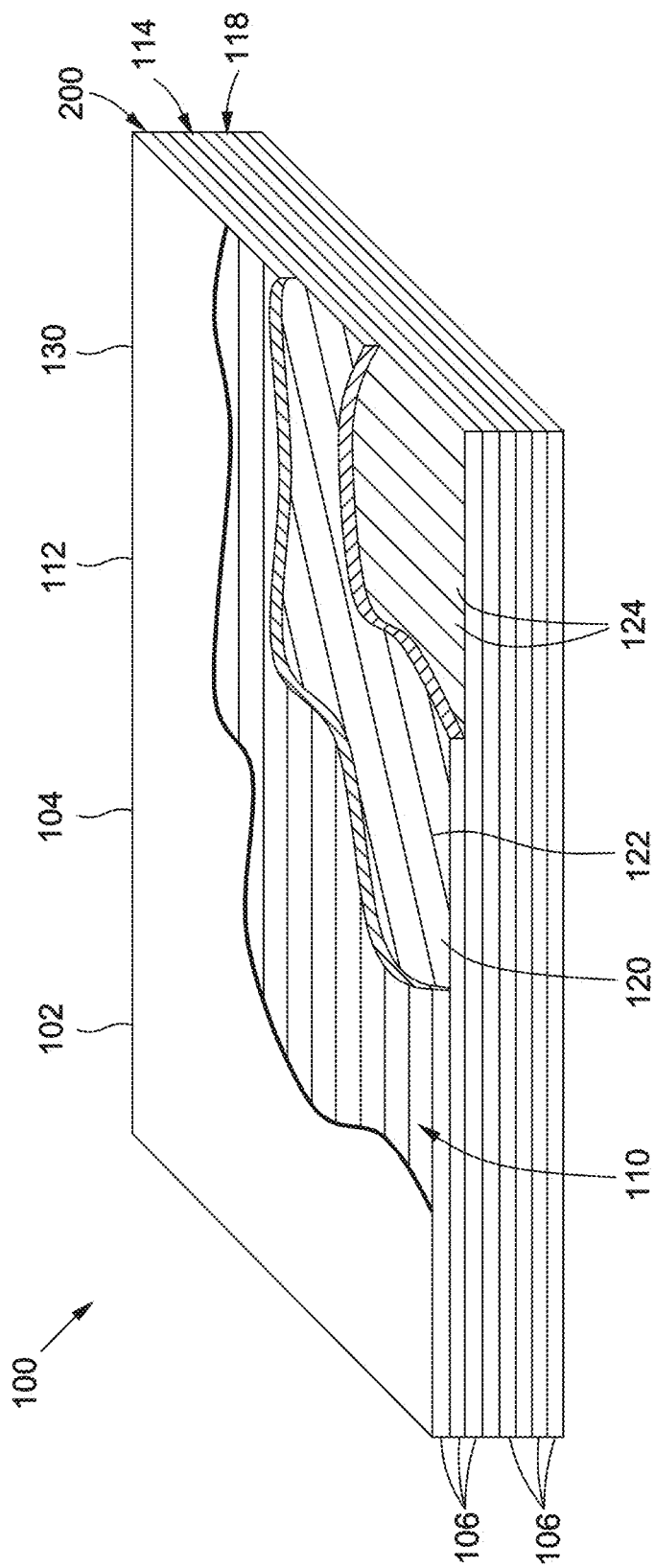
FIG. 2 is a perspective view of a composite structure including a stack of unidirectional plies each formed of a plurality of continuous reinforcing fibers.

FIG. 2 shows an example of a composite structure 100 formed as a laminated stack of unidirectional plies 110. Each one of the unidirectional plies 110 may include a plurality of parallel, continuous fiber tows 120 (e.g., reinforcing fibers) or unidirectional tape 124 laid side-by-side. The reinforcing fibers 120 or tape 124 may be made up of a plurality of reinforcing filaments 122. A single fiber tow 120 or unidirectional tape 124 may include a bundle of several thousand reinforcing filaments 122 (e.g., 1000 to 100,000 or more reinforcing filaments). In some examples, a reinforcing filament may have a filament cross-sectional width or diameter of 5-30 microns. For example, a carbon reinforcing filament may have a filament cross-sectional width of approximately 5-7 microns. Glass reinforcing filaments may have a filament cross-sectional width of 10-25 microns. Although not shown, composite fibers 120 in the present disclosure may also encompass chopped fibers as may be incorporated into a fiber mat. In the present disclosure, the terms reinforcing fiber, fiber tow, and composite fiber may be used interchangeably.

In some examples, a composite structure 100 may be formed of composite plies 106 that may be pre-impregnated with resin 114 (e.g., prepreg composite plies) containing polymer nanoparticles 200. For example, one or more composite plies 106 (FIG. 2) of a composite structure 100 (FIG.

2) may be formed of prepreg fiber tows 120, (FIG. 2), prepreg unidirectional tape 124 (FIG. 2), prepreg woven fabric 126 (FIG. 6), braided prepregs, and other forms of prepreg including stitched fiber forms and chopped fiber forms (e.g., chopped fiber mat). In other examples, the composite structure 100 may be laid up with composite plies 106 that may be pre-impregnated with unmodified resin 116 (FIG. 8), after which polymer nanoparticles 200 may be applied to one or more locations of the composite layup 102 (FIG. 2).

Alternatively, a composite structure 100 may be formed as one or more dry fiber preforms 130 which may be infused with resin 114. For example, a composite structure 100 (FIG. 2) may be formed by laying up dry fiber tows, dry unidirectional tape, dry fiber sheets, dry woven fabric, and/or other forms of dry fiber. The dry fiber preforms 130 (FIG. 2) may be arranged in a stack of composite plies 106 (FIG. 2) into which resin 114 (FIG. 2) may be infused in a wet layup process. In some examples, unmodified resin 116 may be infused into a dry fiber preform 130 (FIG. 2), after which polymer nanoparticles 200 (FIG. 1) may be applied to one or more locations of the composite layup. For example, polymer nanoparticles 200 may be applied to resin-rich pockets 132 (FIG. 6) of a composite layup 102. In other examples, a resin mixture 118 (FIG. 2) containing polymer nanoparticles 200 may be infused into a dry fiber preform 130 resulting in the polymer nanoparticles 200 distributed in bulk throughout the composite layup 102.

In any one of the examples disclosed herein, the resin 114 (FIG. 2) may be formed from thermoplastic material or thermosetting material. Thermoplastic material may include at least one of the following: acrylics, fluorocarbons, polyamides, polyolefins (e.g., polyethylenes, polypropylenes), polyesters, polycarbonates, polyurethanes, polyaryletherketones (e.g., polyetheretherketone (PEEK, polyetherketoneketone (PEKK), polyetherketoneetherketone (PEKEK), etc.), and polyetherimides. Thermosetting material may include at least one of the following: polyurethanes, phenolics, polyimides, sulphonated polymer (polyphenylene sulphide), a conductive polymer (e.g., polyaniline), benzoxazines, bismaleimides, cyanate esthers, polyesters, epoxies, and silsesquioxanes. In addition, in any one of the examples disclosed herein, the reinforcing filaments 122 or fibers 120 (FIG. 2) may be formed from materials such as carbons, silicon carbide, boron, ceramic, and metallic material. The reinforcing filaments 122 or fibers 120 may also be formed from glass such as E-glass (alumino-borosilicate glass), S-glass (alumino silicate glass), pure silica, borosilicate glass, optical glass, and other glass compositions.

As indicated above, the polymer nanoparticles 200 may be pre-cured or solidified prior to curing the resin 114. In some examples, the polymer nanoparticles 200 may be pre-cured up to at least a gelled state such that the polymer nanoparticles 200 (FIG. 1) may retain their geometric shape prior to curing of the resin 114. As indicated below, in one example, the polymer nanoparticles 200 may be soluble or semi-soluble in the resin 114 (FIG. 2). In some examples, the polymer nanoparticles 200 may remain solid below the glass temperature of the resin 114 and/or below the cure temperature of the resin 114. In other examples, the polymer nanoparticles 200 may at least partially dissolve within the resin 114 above the glass transition temperature and/or above the cure temperature of the resin 114.

The polymer nanoparticles 200 may be formed from any one of the above-mentioned thermoplastic materials and thermosetting materials from which the resin may be formed. In some examples, some of the polymer nanoparticles 200 may have a non-elastomeric thermoset component. In some examples, some of the polymer nanoparticles 200 may be formed of thermoplastic material without an elastomeric component. In addition, some of the polymer nanoparticles 200 in a resin mixture 118 may have a different composition 112 than other polymer nanoparticles 200 in the resin mixture 118 (FIG. 2). In some examples, the polymer nanoparticles 200 may have the same chemical composition 112 as the base resin 114, although the polymer nanoparticles 200 may be partially or fully cured prior to curing the resin 114 (FIG. 2) which may advantageously reduce the effective cure shrinkage and heat of reaction of the resin mixture 118 relative to the cure shrinkage and heat of reaction of unmodified resin 116 (FIG. 8). In some examples, the polymer nanoparticles 200 (FIG. 4) may be provided as core-sheath nanoparticles 206 including a sheath 208 (FIG. 9) encapsulating a core 210. The core 210 (FIG. 10) may have a chemical composition that is different than the chemical composition of the sheath 208. For example, the sheath 208 may be formed of thermoplastic material and the core may be formed of thermosetting material. Prior to the introduction of the resin 114, the temperature of the sheath 208 may be heated above its glass transition temperature which may allow the sheath 208 to adhesively bond or melt-fuse to a reinforcing filament 158, while the sheath 208 remains in a solid state during processing (e.g., curing) of the resin 114 such that the core 210 remains after curing of the resin 114.

The polymer nanoparticles 200 may be provided with a cross-sectional width 202 (FIG. 10) or particle diameter of 10-200 nanometers. In some examples, the polymer nanoparticles 200 may have a cross-sectional width 202 of between 10-100 nanometers. However, in other examples, the polymer nanoparticles 200 may have a cross-sectional width 202 of up to 2 microns. Providing the polymer nanoparticles 200 in a relatively small cross-sectional width 202 may prevent or reduce filtering out of overly-large nanoparticles during prepregging operations or during resin infusion. In this regard, an overly-large nanoparticle may prevent passage of the nanoparticle between adjacent reinforcing fibers or tows 120 (FIG. 2).

In some examples, the polymer nanoparticles 200 may be provided in different particle sizes. For example, some of the polymer nanoparticles 200 (FIG. 4) in a composite layup 102 (FIG. 4) may have a larger cross-sectional width than other polymer nanoparticles 200 in the same composite layup 102. In this regard, the different particle cross-sectional widths of the polymer nanoparticles 200 may provide a means to locally control the resin viscosity and/or locally improve the resin toughness. In addition, the use of different particle cross-sectional widths may enable different volumetric ratios of liquid resin to nanoparticles within a composite layup 102.

The polymer nanoparticles 200 may also be provided in one or more geometric shapes. For example, the polymer nanoparticles 200 (FIG. 4) may have a generally spherical or rounded outer shape to avoid increasing the resin viscosity. In some examples, the polymer nanoparticles 200 may be provided as a solid sphere, a hollow sphere, and/or as a core-sheath nanoparticle 206 (FIG. 9). However, the polymer nanoparticles 200 may be provided in non-spherical shapes that may preferably have a reduced effect on the viscosity of the resin 114 (FIG. 4). For example, the polymer nanoparticles 200 may be provided in generally rounded shapes such as oblong or elliptical shapes, or as a three-dimensional faceted shapes including, but not limited to, cubes, rectangles, pyramids, and other shapes.

Advantageously, the relatively small cross-sectional width 202 (FIG. 10) and/or the generally rounded shape (e.g., spherical) of the polymer nanoparticles 200 may allow for a relatively high concentration of polymer nanoparticles 200 (FIG. 4) within the resin 114 (FIG. 4) with a relatively small increase in resin viscosity. In some examples, the polymer nanoparticles 200 may constitute up to 75 percent by volume of a resin mixture 118 containing resin 114 and polymer nanoparticles 200. Preferably, the polymer nanoparticles 200 may constitute a minimum of 10 percent by volume of a resin mixture 118 as the low end of a range of volumetric percentage of polymer nanoparticles 200. However, in some examples, the polymer nanoparticles 200 may constitute no less than 5 percent by volume at the low end of the range. In still other examples, the polymer nanoparticles 200 may constitute no less than 10 percent by volume of the resin mixture 118 at the low end of the range. In further examples, the polymer nanoparticles 200 may constitute no less than 15 percent by volume at the low end of the range.

In certain applications, it may be desirable to provide the polymer nanoparticles 200 at a maximum of 65 percent by volume of a resin mixture 118 as a high end of a range of percentage by volume of polymer nanoparticles 200. However, in some examples, the polymer nanoparticles 200 may constitute no more than 50 percent by volume as the high end of the range. In certain applications, polymer nanoparticles 200 may be provided in any combination of the above-mentioned low end and high end of the range of volumetric percentage of polymer nanoparticles 200 of a resin mixture 114. Non-limiting examples of combinations of the above-mentioned low end and high end of a range of percentage by volume of polymer nanoparticles 200 include an arrangement wherein the polymer nanoparticles 200 constitute from 5-75 percent by volume of a resin mixture 118. Another example may include polymer nanoparticles 200 that constitute from 10-75 percent by volume of a resin mixture 118. In still other examples, the polymer nanoparticles 200 may constitute from 15-65 percent by volume of a resin mixture 118. In an even further example, the polymer nanoparticles 200 may constitute from 20-50 percent by volume of a resin mixture 118. Advantageously, the generally rounded or spherical shape of the polymer nanoparticles 200 allows for linear improvements in the resin 114 properties with linear increases in the concentration level of polymer nanoparticles 200 in the resin 114 with minimal or negligible effect on resin viscosity.

The polymer nanoparticles 200 may be externally fabricated prior to addition of the polymer nanoparticles 200 to the resin 114. However, in some examples, the polymer nanoparticles 200 may be formed by in-situ growth within the resin 114 (FIG. 2). External fabrication of the polymer nanoparticles 200 (FIG. 2) may be provided by one or more techniques including, but not limited to, emulsion polymerization, nano-precipitation, rapid expansion of supercritical fluid (RESS), rapid expansion of supercritical fluid into solvent (RESOLV), and self-assembly. Polymer nanoparticle fabrication may also be provided by nano-printing, nano-lithography, or other techniques, including growing polymer nanoparticles 200 onto a substrate or nucleus of a polyhedral oligomeric silsesquioxane (POSS) compound, or on other very small, functionalized substrates such as on carbon nano-tubes, bucky balls, and nano-silica.

FIG. 3 shows a cross-section of a portion of the composite structure 100 of FIG. 2. In the example shown, each one of the composite plies 106 of the composite structure 100 is formed of unidirectional tape 124. However, one or more of the composite plies 106 may be formed of other fiber forms such as unidirectional sheet (not shown). The fibers 120 in one composite ply 106 may be oriented non-parallel to the fibers 120 in an adjacent composite ply 106 (e.g., above or below) in the stack. However, one or more of the composite plies 106 may include fibers 120 (FIG. 2) that are oriented parallel to the fibers 120 in an adjacent composite ply 106. For example, in FIG. 2, the middle two composite plies 106 of the stack include filaments 122 oriented parallel to the plane of the paper.

FIG. 4 is an enlarged view of a portion of the composite structure 100 of FIG. 3 and showing a plurality of polymer nanoparticles 200 in resin 114. In the example shown, the polymer nanoparticles 200 may be uniformly distributed throughout the composite layer. For example, a composite layup 102 may be formed of unidirectional tape 124 pre-impregnated with the resin mixture 118 containing polymer nanoparticles 200. During processing of the composite layup 102, the viscosity of the resin 114 may be reduced allowing the polymer nanoparticles 200 to become uniformly distributed throughout the composite layup 102. However, in another example not shown, a composite layup 102 may be formed of unidirectional tape 124 pre-impregnated with unmodified resin 116 (FIG. 8). During and/or following the layup of the unidirectional tape 124, polymer nanoparticles 200 may be selectively applied to target locations in the composite layup. For example, a solution containing polymer nanoparticles 200 may be applied to resin-rich pockets 132 (FIG. 6) of the composite layup 102. A resin-rich pocket 132 may be described as a high-resin-content location in the composite layup 102 or composite structure 100, or a location that has a large volume of resin 114 relative to the volume of fibers 120 at the specific location.

Polymer nanoparticles 200 may be applied to resin-rich pockets 132 (FIG. 6) between the opposing lateral sides of an adjacent pair of unidirectional tapes 124, and/or in the interlaminar region 108 between upper and lower surfaces of adjacent composite plies 106. In some examples, polymer nanoparticles 200 may be applied selectively throughout a composite structure 100. For example, polymer nanoparticles 200 may be applied at or between certain composite plies 106 of a composite layup 102 (e.g., only the middle plies, or only the end-most plies), while other composite plies 106 may be devoid of polymer nanoparticles 200. Polymer nanoparticles 200 may be placed in the resin-rich pockets 132 (FIG. 6) by manual placement and/or by using a robotic device (not shown). Polymer nanoparticles 200 may be applied to the reinforcing filaments 122 and/or to fiber tows 120 (FIG. 2) during manufacturing of the reinforcing filaments 122 and/or to fiber tows 120, and which may be later formed into unidirectional tape, unidirectional sheet, woven fabric, and other fiber forms. As indicated above, polymer nanoparticles 200 may also be applied to a fiber form during prepregging operations.

In some examples, polymer nanoparticles 200 may be applied in a manner such that the nanoparticles 200 are predominately located within a fiber bed, or the polymer nanoparticles 200 (FIG. 4) may be applied only to the fibers 120 (FIG. 2) prior to infusion of resin 114 (FIG. 4) into a composite layup 102 (FIG. 4). Polymer nanoparticles 200 may also be selectively applied to the outer surfaces of a composite structure 100 (FIG. 4) to provide targeted functionality. For example, polymer nanoparticles 200 may be applied to the external surface or portion of a composite structure 100 that interfaces or mates with a metallic component. In one example, polymer nanoparticles 200 may be applied to locations of a composite skin that may be placed in abutting contact with a metallic component such as a metallic stiffener, stringer, spar, rib, bracket, or other metallic component. In a further example not shown, polymer nanoparticles 200 may be provided in a film (not shown) in a macroscopic pattern. The film of polymer nanoparticles 200 may be applied to one or more locations of a composite layup 102 to address specific performance needs. For example, a film of polymer nanoparticles 200 may be applied to a layup of a composite laminate 104 to reduce or prevent fatigue-induced propagation of microcracks.

FIG. 5 shows a composite structure 100 arranged as a stack of composite plies 106 of bi-directional woven fabric 126 (FIG. 6). Each one of the woven fabric 126 plies may be formed by weaving fiber tows 120 or roving. In one example, the composite plies 106 may be pre-impregnated with unmodified resin 116 (e.g., prepreg). However, in other examples, the composite plies 106 may be pre-impregnated with a resin mixture 118 containing polymer nanoparticles 200.

FIG. 6 is a sectional view of a portion of the composite structure 100 of FIG. 5 and showing the targeted placement of polymer nanoparticles 200 in resin-rich pockets 132 at the divots 128 and/or intersections of the fiber tows 120 of the woven fabric 126. In the example shown, the woven fabric 126 may be pre-impregnated with unmodified resin 116 (FIG. 6). During the process of laying up the composite plies 106, polymer nanoparticles 200 may be placed into the resin-rich pockets 132 such as at the divots 128 and/or intersections of the fiber tows of the woven fabric 126. For example, a solution containing polymer nanoparticles 200 may be sprayed into the divots 128 of the woven fabric 126 of one or more of the plies. As described in greater detail below, the polymer nanoparticles 200 may mitigate or prevent crack initiation and/or crack growth within the resin-rich pockets 132 by improving the toughness of the resin 114, lowering the cure temperature, reducing the cure shrinkage, or by other mechanisms which may reduce or prevent thermally-induced internal stresses that may lead to microcracking or crack propagation in the resin 114.

Following the layup of the composite plies 106, the resin 114 in the prepreg woven fabric 126 (FIG. 6) may be heated to reduce the viscosity of the resin 114 and allow the resin 114 to flow and intermingle with the resin 114 (FIG. 6) of adjacent woven fabric 126 plies and with the polymer nanoparticles 200 in the resin-rich pockets 132 (FIG. 6). The composite layup 102 (FIG. 6) may be consolidated and cured to form a composite structure 100. In another example of manufacturing a composite structure 100, a composite layup 102 (FIG. 6) of woven fabric 126 plies may be pre-impregnated with a resin mixture 118 containing polymer nanoparticles 200. Additional polymer nanoparticles 200 (FIG. 6) may be placed into the resin-rich pockets 132 at the divots 128 (FIG. 6) of one or more woven fabric 126 plies. The composite layup 102 may be held at an elevated temperature to cure the resin 114 into a solidified or hardened state after which the composite layup 102 may be passively or actively cooled to ambient temperature. In a further manufacturing example, woven fabric 126 may be provided as dry fiber preforms 130 arranged in a stack and which may be infused with a resin mixture 118 (FIG. 6) containing polymer nanoparticles 200 in a wet layup process after which the resin 114 may be cured to form a composite structure 100 (FIG. 6).

Figure 7A:
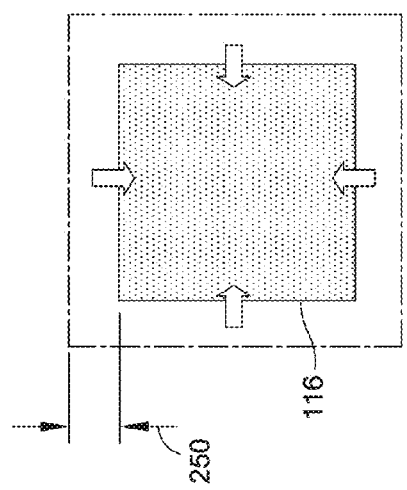
FIG. 7A is a schematic illustration of the cure shrinkage of the unmodified resin of FIG. 7.
Figure 7:
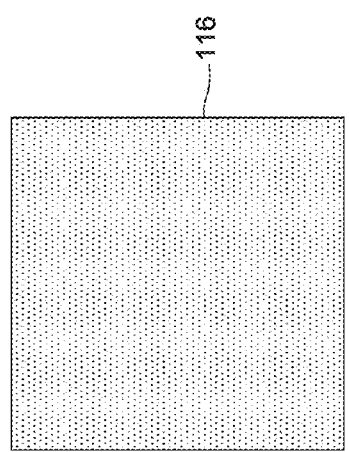
FIG. 7 is a schematic illustration of unmodified resin with no nanoparticles in the unmodified resin.

FIG. 7 is a schematic illustration of uncured unmodified thermosetting resin 114 (FIG. 6) with no nanoparticles in the unmodified resin 116. FIG. 7A is a schematic illustration of the free volumetric cure shrinkage 250 of the unmodified resin 116 of FIG. 7 during curing of the thermosetting resin 114. As indicated above, cure shrinkage 250 of resin 114 may result in thermally-induced internal stresses which may lead to microcracking in the resin 114 under mechanical loading or thermal cycling. Thermally-induced stresses within the resin 114 may also result in distortion and/or warping of the shape of the cured composite structure 100.

FIG. 8 is a schematic illustration of an uncured resin mixture 118 of thermosetting resin 114 (FIG. 6) containing a plurality of polymer nanoparticles 200. As indicated above, the polymer nanoparticles 200 may be fabricated prior to incorporation into the resin 114. The polymer nanoparticles 200 may or may not be made from the same material as the base resin 114, and may be at least partially-cured and/or solidified prior to mixing with and/or curing the resin 114.

Figure 8A:
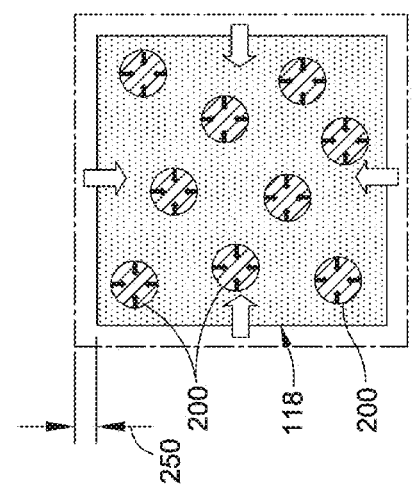
FIG. 8A is a schematic illustration of the reduced cure shrinkage of the resin mixture of FIG. 8 relative to the cure shrinkage of the unmodified resin of FIG. 7A.
Figure 8:
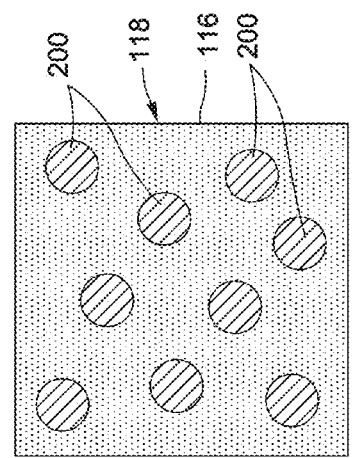
FIG. 8 is a schematic illustration of an uncured resin mixture comprising resin containing a plurality of polymer nanoparticles.

FIG. 8A is a schematic illustration of the reduced cure shrinkage 250 of the resin mixture 118 of FIG. 8 relative to the cure shrinkage 250 of the unmodified resin 116 of FIG. 7A. Advantageously, the polymer nanoparticles 200 may have a lower cure shrinkage than the resin 114 (FIG. 6) or a non-existent cure shrinkage during the resin cure cycle such as after the gel point of the resin 114. The lower cure shrinkage of the polymer nanoparticles 200 may reduce the overall volumetric cure shrinkage of the resin mixture 118 due to a reduction in the cumulative cure shrinkage of the bare resin 114 and also due to the solidified polymer nanoparticles 200 physically constraining the shrinkage of the bare resin 114. In some examples, the polymer nanoparticles 200 may have a particle coefficient of thermal expansion (CTE) that may reduce the overall CTE of the resin mixture 118 and thereby reduce thermally-induced internal stresses that may otherwise develop with potential microcracking of the resin. A reduction in cure shrinkage and/or a favorable CTE as provided by the polymer nanoparticles 200 may also reduce distortion in the shape of the cured composite structure 100 (FIG. 6).

FIG. 9 is a schematic illustration of an uncured resin mixture 118 containing a plurality of core-sheath nanoparticles 206. Each one of the core-sheath nanoparticles 206 may include a soluble sheath 208 encapsulating a shaped particle 212. The sheath 208 may be generally rounded or spherical to improve the dispersion of the core-sheath nanoparticles 206 within the resin 114 and to minimize the effects on resin viscosity. The core-sheath nanoparticles 206 may be implemented in thermosetting resins and in thermoplastic resins as may be used in composite laminates, adhesives, coatings, and injection-molded plastic. The size, shape and configuration of the shaped particles 212 may be selected to provide specific functionalities including, but not limited to, asymmetric properties such as stiffness, strength, and toughness of the composite structure 100. In some examples, the shaped particles 212 may be electrically conductive to improve the electrical charge distribution capability of a composite structure 100 (FIG. 6) such as in the event of a lightning strike on the composite structure 100.

Figure 9A:
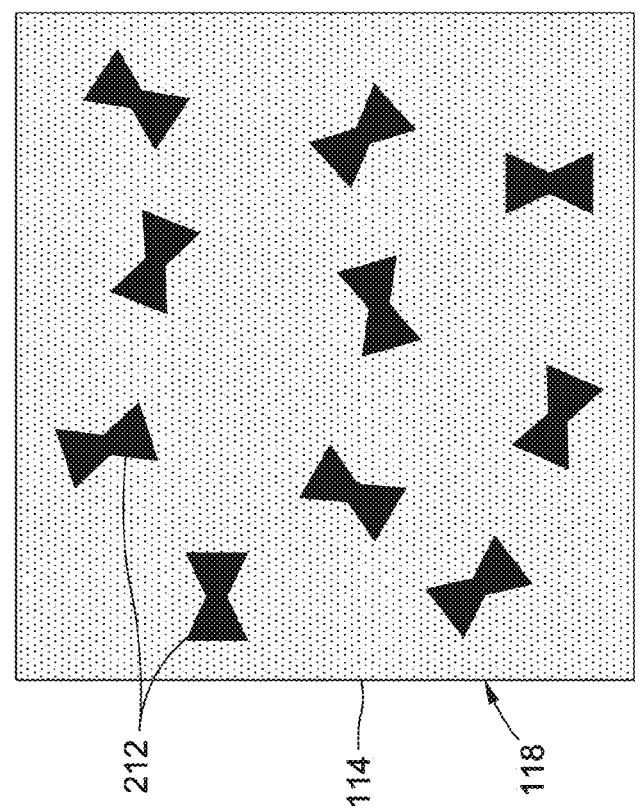
FIG. 9A is a schematic illustration of the cured resin mixture of FIG. 9 after dissolution of the sheaths such that the shaped particles remain in the resin.
Figure 9:
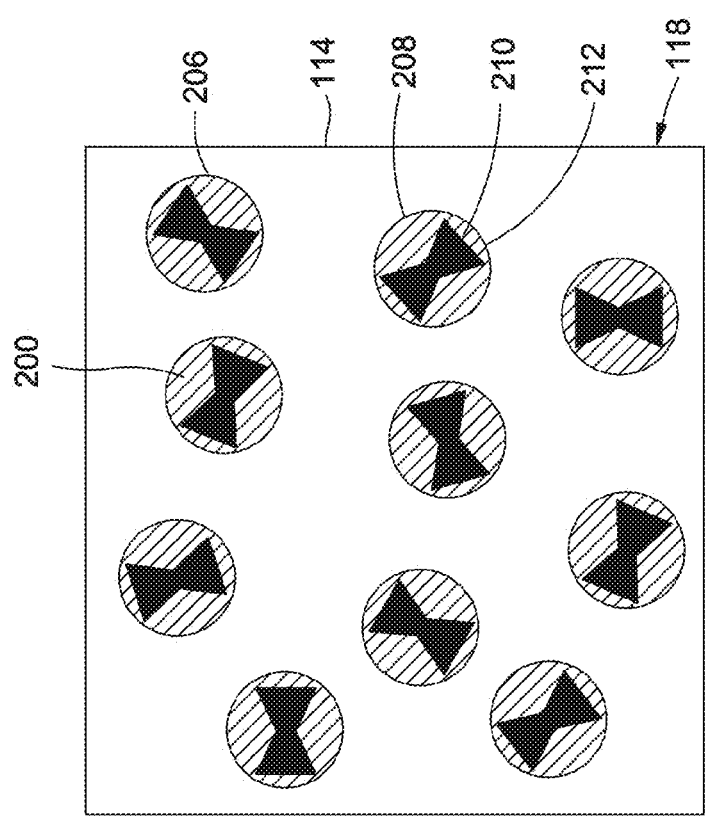
FIG. 9 is a schematic illustration of an uncured resin mixture containing a plurality of core-sheath nanoparticles each having a soluble sheath encapsulating a shaped particle.

FIG. 9A is a schematic illustration of the cured resin mixture 118 of FIG. 9 after dissolution of the sheaths 208 during curing of the resin 114 such that only the shaped particles 212 remain. In some examples, the dissolution of the soluble sheath 208 within the resin 114 may improve the toughness of the resin mixture 118. Advantageously, by using spherical sheaths 208, the shaped particles 212 may be uniformly disbursed within the resin 114 without agglomeration during resin flow. In some examples, an electric field or magnetic field (not shown) may be applied to the resin 114 prior to curing to align the shaped particles 212 along one or more common directions. For example, the shaped particles 212 may be aligned along a direction to favorably influence the direction of crack propagation within the resin 114. Although the shaped particles 212 are shown in a bow tie configuration, the shaped particles 212 may be provided with any number of desired shapes including, but not limited to, a cylinder, a toroid, a cube, a pyramid, a three-dimensionally-faceted polygon, and other shapes. The shaped particles 212 may be formed of metallic material, polymeric material, ceramics, glass, and/or any combination thereof.

Figure 10:
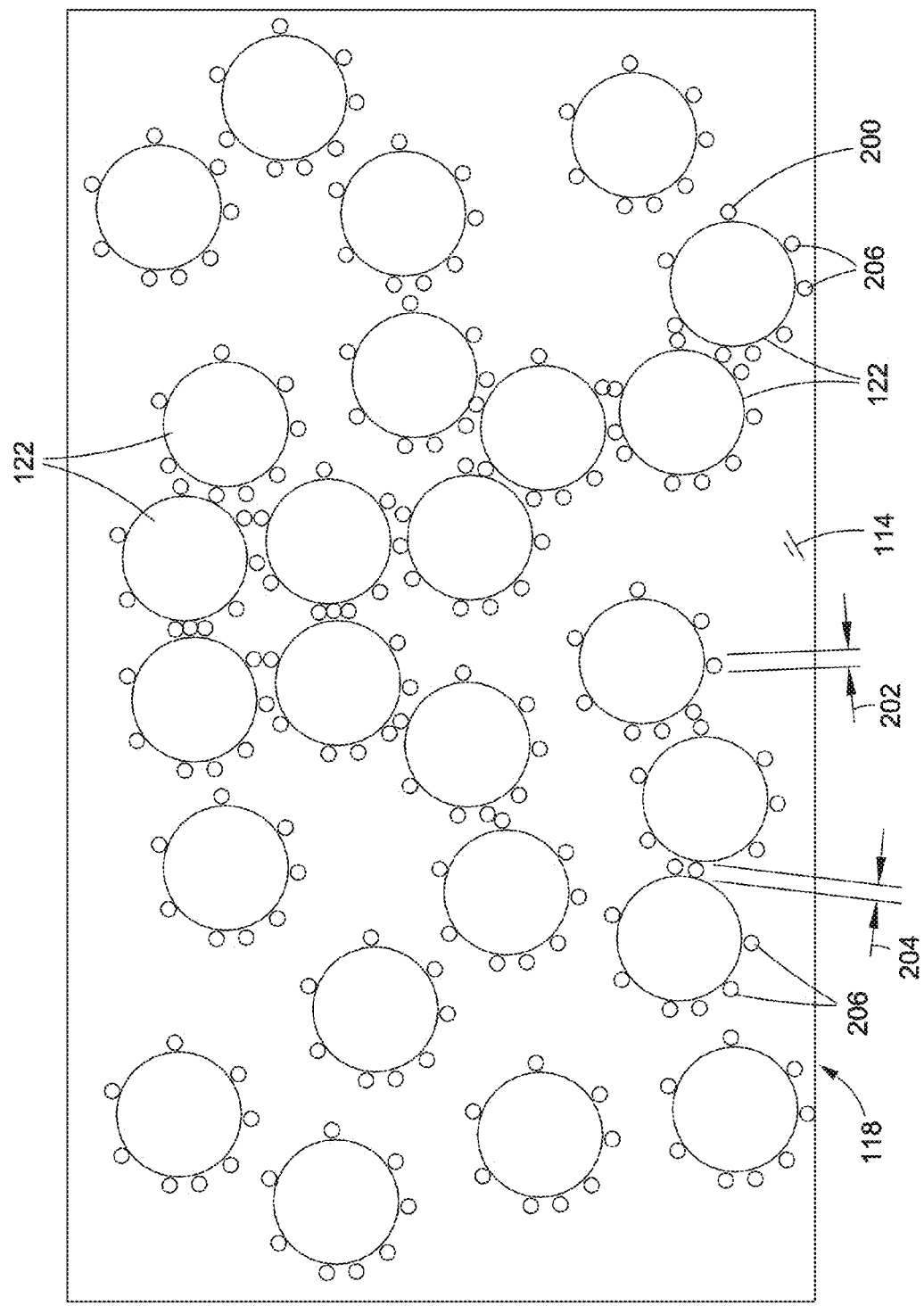
FIG. 10 is a schematic illustration of reinforcing filaments within a resin mixture containing core-sheath nanoparticles melt-fused to the reinforcing filaments and showing the core-sheath nanoparticles having a particle cross-sectional width selected to maintain a minimum filament spacing between adjacent reinforcing filaments.

FIG. 10 is a sectional illustration of a plurality of reinforcing filaments 122 within a resin mixture 118 containing polymer nanoparticles 200. The polymer nanoparticles 200 may act as spacers to prevent the reinforcing filaments 122 from touching one another and to control the permeability of the fibers 120 (FIG. 6). The core polymer nanoparticles 200 may be formed with a predetermined particle cross-sectional width 202 which may be selected to maintain a minimum filament spacing 204 between adjacent reinforcing filaments 122. In this manner, the polymer nanoparticles 200 provide a clear path for resin 114 to flow between the reinforcing filaments 122 and allow for uniform wet out of the reinforcing filaments 122 and/or fibers 120 during resin infusion. In addition, by preventing direct contact between filaments 122 or fibers 120, the polymer nanoparticles 200 may avoid or prevent stress concentrations and microcracking that may otherwise initiate at locations of fiber-to-fiber contact. In some examples, the polymer nanoparticles 200 may be configured as non-core-sheath nanoparticles (e.g., FIG. 8) formed of a single homogenous phase. An outer portion of such non-core-sheath nanoparticles may be melt-fused to the reinforcing filaments 122. In other examples, the polymer nanoparticles 200 may be configured as core-sheath nanoparticles 206 having a sheath 208 surrounding a core 210. The sheath 208 of such core-sheath nanoparticles 206 may be melt-fused to the reinforcing filaments 122 such that the core-sheath nanoparticles 206 act as spacers.

Figure 12:
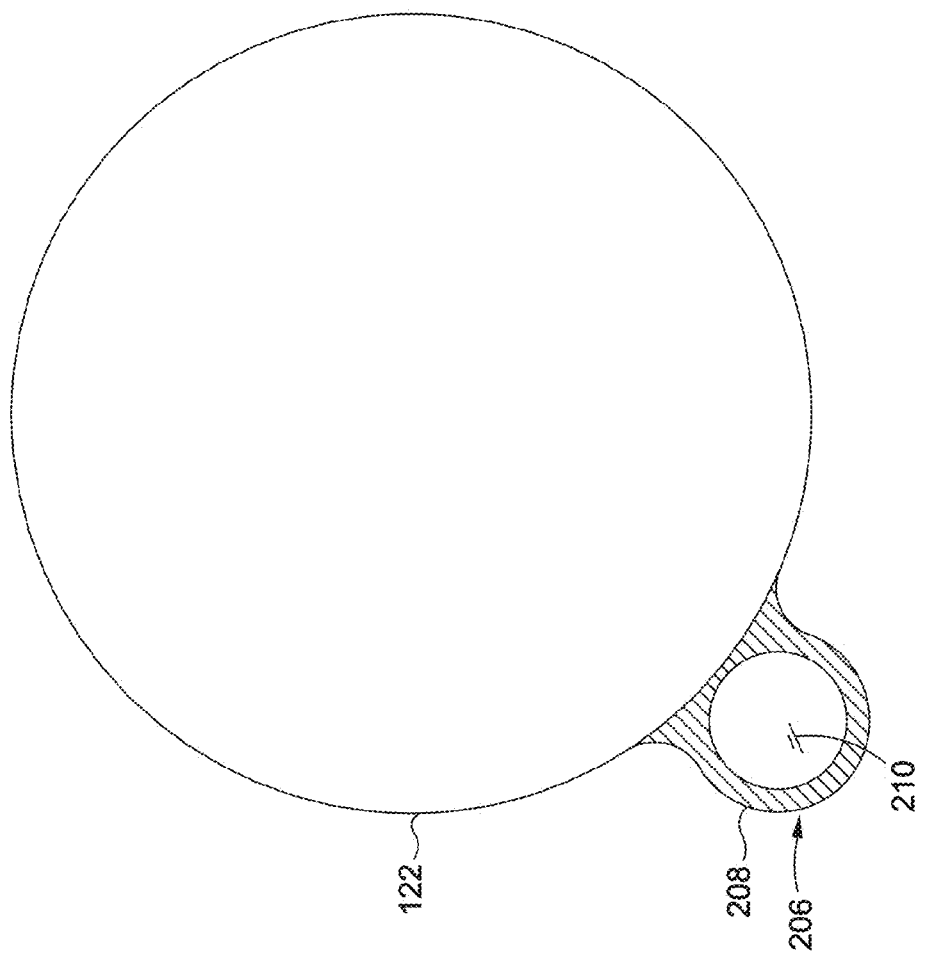
FIG. 12 is a schematic illustration of the sheath of a core-sheath nanoparticle melt-fused to a reinforcing filament.
Figure 11:
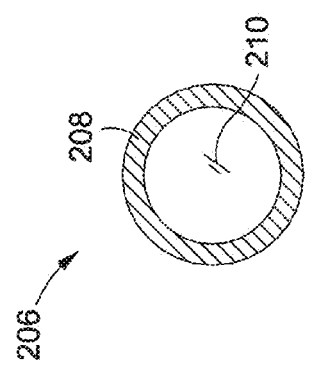
FIG. 11 is a schematic illustration of a core-sheath nanoparticle having a melt-fusible sheath.

FIG. 11 is a schematic illustration of a core-sheath nanoparticle 206 having a melt-fusible sheath. As indicated above, the core 210 may be formed of a different material than the sheath 208. For example, the core 210 may be formed of a thermosetting material or may have a relatively high glass transition temperature, and the sheath 208 may have a relatively low glass transition temperature. FIG. 12 is a schematic illustration of the sheath 208 of a core-sheath nanoparticle 206 melt-fused to a reinforcing filament 122. The core 210 may be configured to resist deformation during the process of applying the polymer nanoparticles 200 (FIG. 9) to the reinforcing filaments 122. The core-sheath nanoparticles 206 may be applied to reinforcing filaments 122 and fiber tows 120 (FIG. 6) after fabrication of the filaments 122 and fibers 120, and prior to infusion of resin 114 (FIG. 6) into a composite layup 102 (FIG. 6). In some examples, the core-sheath nanoparticles 206 may be applied to reinforcing filaments 122 and fiber tows 120 prior to or during prepregging.

Figure 13A:
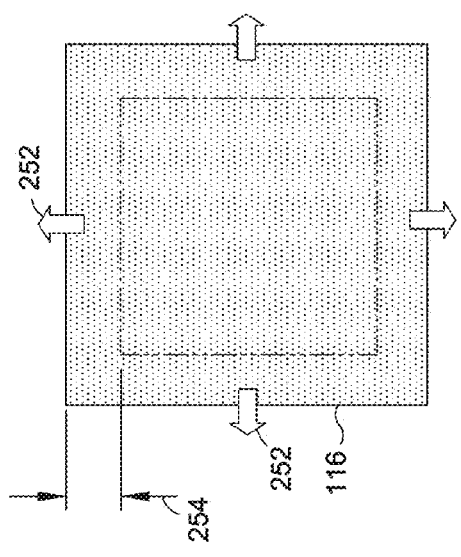
FIG. 13A is a schematic illustration of biaxial tension applied to the cured unmodified resin and the resulting strain uniformly distributed throughout the resin.
Figure 13:
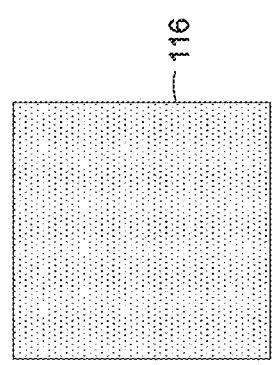
FIG. 13 is a schematic illustration of a cured unmodified resin with no polymer nanoparticles in the unmodified resin.

FIG. 13 is a schematic illustration of a cured unmodified resin 116 with no polymer nanoparticles 200 in the unmodified resin 116. FIG. 13A is a schematic illustration of biaxial tension 252 applied to the cured unmodified resin 116 and illustrating the resulting strain uniformly distributed throughout the cured unmodified resin 116. The distribution of strain within the unmodified resin 116 represents a potential drawback to composite structures 100 (FIG. 4). For example, when a load (not shown) is placed on a composite structure 100, the reinforcing filaments 122 typically constrain the resin against contraction. The reduced capability of unmodified resin 116 to contract limits the tensile strain capability of the unmodified resin 116. As a result of the limit on the strain capability of the unmodified resin 116, the performance of the composite structure 100 may be limited. For example, when a composite structure 100 is loaded in tension, the relatively low failure strain of unmodified resin 116 may result in failure of the unmodified resin 116 (e.g., microcracking) prior to the reinforcing filaments 122 reaching their failure strain.

Figure 14A:
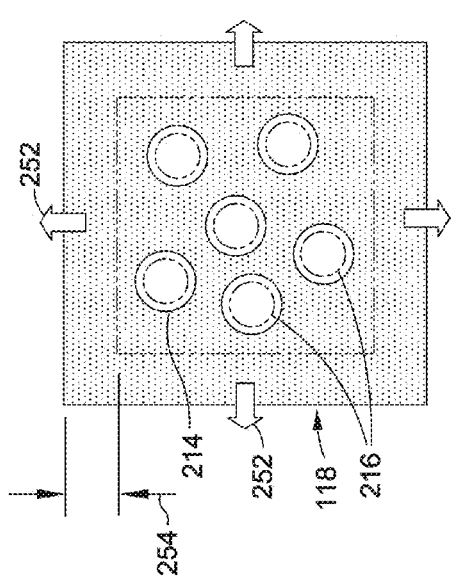
FIG. 14A is a schematic illustration of biaxial tension applied to the cured resin mixture and resulting in distortion of the porous polymer nanoparticles to reduce the strain in the resin.
Figure 14:
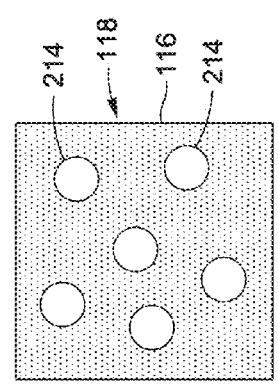
FIG. 14 is a schematic illustration of a cured resin mixture comprising resin containing a plurality of porous polymer nanoparticles.

FIG. 14 is a schematic illustration of a cured resin mixture 118 comprising resin 114 containing a plurality of highly-distortionally-capable polymer nanoparticles 214. The highly-distortionally-capable polymer nanoparticles 214 may be inherently highly-distortionally-capable due to the nature of the polymer backbone, or due to a porosity of the polymer nanoparticles 214. In a further example, the polymer nanoparticles 214 may have a relatively high free volume which may provide a relatively high distortional capability. FIG. 14A is a schematic illustration of biaxial tension 252 applied to the cured resin mixture 118 and showing the mechanical distortion 216 of the highly-distortionally-capable polymer nanoparticles 214. Advantageously, the distortion of the polymer nanoparticles 214 provides the cured resin mixture 118 with a strain 254 capability along at least one direction that is greater than the strain capability of an unmodified resin 116 (FIG. 8) that lacks polymer nanoparticles 200 (FIG. 8).

FIG. 15 is a schematic illustration of an uncured, unmodified thermosetting resin 116. FIG. 15A is a schematic illustration of the heat of reaction 256 released or generated by the unmodified resin 116 during curing. Heat that is released during curing of the unmodified resin 116 may result in heating of the resin 116 above the degradation temperature limit of the resin 116 and/or may result in inhomogeneous curing rates in the resin 116 Inhomogeneous of uneven curing rates can result in distortion of the shape of the composite structure 100 (FIG. 6) due to the formation of internal stresses in different regions of the final composite structure 100. Shape distortion of the composite structure 100 and/or degradation of the resin 116 may result in a reduction in the mechanical performance of the composite structure 100.

FIG. 16 is a schematic illustration of an uncured thermosetting resin mixture 118 containing a plurality of at least partially-cured polymer nanoparticles 218. The polymer nanoparticles 218 may be incorporated into the resin 114 during manufacturing of the resin 114. FIG. 16A is a schematic illustration of the heat absorption 224 by the polymer nanoparticles 218 of at least a portion of the heat of reaction 256 generated by the resin 114 during curing. Advantageously, the polymer nanoparticles 218 may have a lower amount of heat release than the resin 114 during the resin curing cycle. The reduction in heat release of the polymer nanoparticles 200 may reduce the total amount of heat generated during curing of the resin mixture 118 due to a reduction in the amount of energy generated during resin curing, and due to the polymer nanoparticles 218 acting as heat sinks Advantageously, the net reduction in heat release of the resin mixture 118 may reduce distortion of the shape of the composite structure 100, and/or may reduce or prevent a degradation of the mechanical properties of the resin 114.

FIG. 17 is a schematic illustration of an uncured resin mixture 118 containing a plurality of fully-soluble polymer nanoparticles 220. In one example, the polymer nanoparticles 220 may be formed of thermoplastic material for toughening a resin 114. The polymer nanoparticles 220 may be relatively uniformly dispersed throughout the resin 114 with minimal affect on the viscosity of the resin 114. FIG. 17A is a schematic illustration of the dissolution of the soluble polymer nanoparticles 220 into the resin 114 of FIG. 17 such as during curing of the resin mixture 118. The dissolution of the polymer nanoparticles 220 may alter the properties of the resin mixture 118. For example, the polymer nanoparticles 220 may increase the toughness of the resin 114. The composition of the polymer nanoparticles 220 may be selected such that the polymer nanoparticles 220 will dissolve at a specific point during the cure cycle. For example, the polymer nanoparticles 220 may be configured to fully dissolve following resin infusion or resin flow through a composite layup 102.

FIG. 18 is a schematic illustration of an uncured resin mixture 118 containing a plurality of partially-soluble polymer nanoparticles 222. FIG. 18A is a schematic illustration of the partial dissolution of the partially-soluble polymer nanoparticles 222 during curing of the resin mixture 118 of FIG. 18. In the example shown, the polymer nanoparticles 222 may be configured to partially dissolve during or after resin cure to provide a gradient of toughness extending from the center of each polymer nanoparticle 222 outwardly toward the base resin 114. The partially-soluble polymer nanoparticles 222 may be relatively uniformly dispersed throughout the resin 114 and may provide locally toughened regions within the resin mixture 118 at controlled distances from one another.

In an example not shown, core-sheath nanoparticles 206 may be added to resin 114 (FIG. 18) wherein each core-sheath nanoparticle 206 (FIG. 12) has a soluble or semi-soluble sheath 208 (FIG. 12) encapsulating an insoluble core 210 (FIG. 12). The semi-soluble or soluble sheath 208 may provide an adhesive bond between the insoluble core 210 and the base resin 114. In this manner, the core-sheath nanoparticles 206 may intimately bond the core 210 to the base resin 114 without a heat-generating reaction. In other examples, 2 or more different types of at least partially-soluble polymer nanoparticles 222 may be included in a resin mixture 118 to provide 2 or more different points during the cure cycle where the different polymer nanoparticles 200 may at least partially dissolve into the resin 114.

In another example not shown, a resin mixture 118 (FIG. 17) may be prepared containing a plurality of soluble or semi-soluble polymer nanoparticles 220 (FIG. 17), 222 (FIG. 18) configured to release either a catalyst or a hardener into a thermosetting resin 114 (FIG. 17) to modify the cure characteristics of the resin 114. Alternatively, a core-sheath nanoparticle 206 (FIG. 12) may include a sheath 208 (FIG. 12) configured to dissolve in a controlled manner at a predetermined temperature to release either a catalyst or hardener into a thermosetting resin 114. As indicated above, the polymer nanoparticles 206, 220, 222 may be formed of any suitable thermosetting or thermoplastic material. The material of the polymer nanoparticles 206, 220, 222 may include a partially or fully-cured version of the resin material. The polymer nanoparticles 206, 220, 222 may be configured to dissolve and release the catalyst or hardener progressively at several distinct points during the resin cure cycle as a means to increase the out-time of the resin 114 and/or lower the cure temperature of the resin 114.

Figure 19:
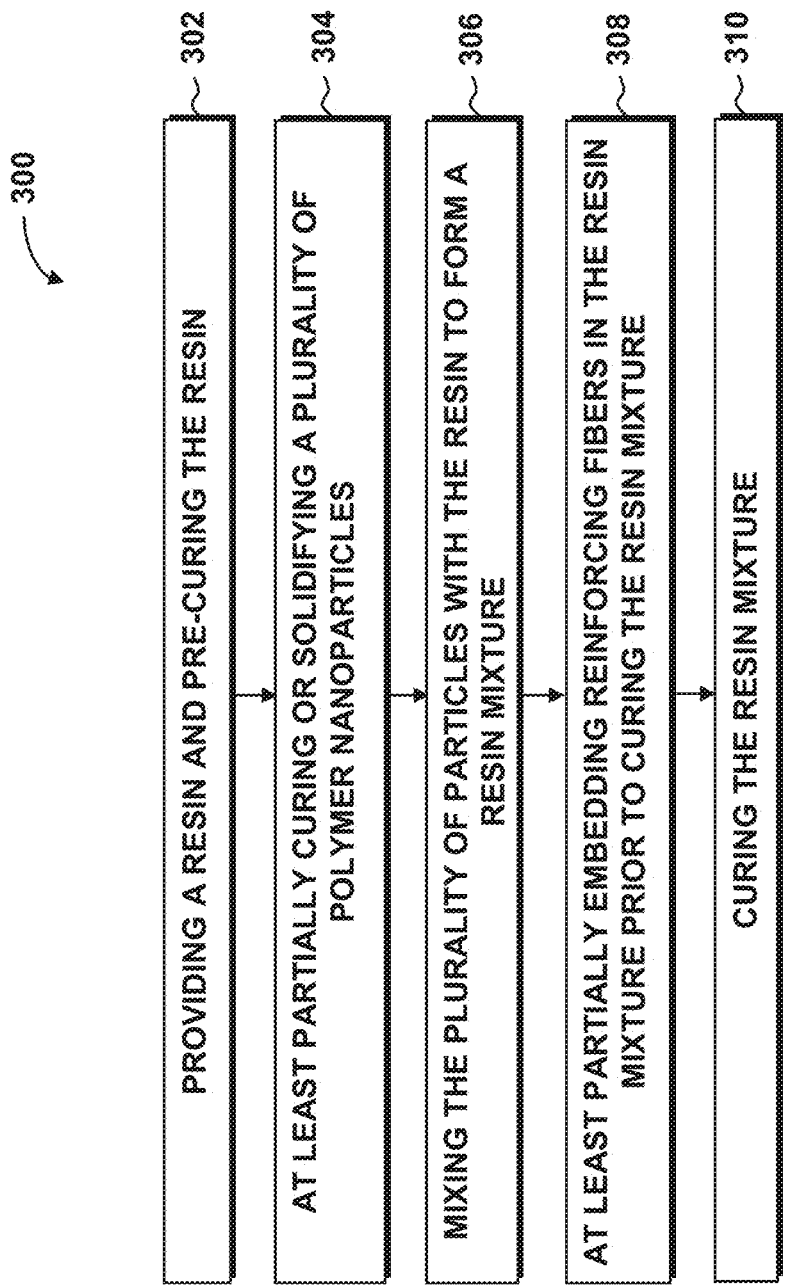
FIG. 19 is a flowchart illustrating one or more operations that may be included in a method of manufacturing a composite structure.

FIG. 19 is a flowchart illustrating one or more operations that may be included in a method 300 of manufacturing a composite structure 100. Step 302 of the method may include providing a resin 114. The resin 114 (FIG. 2) may be a thermosetting resin 114 or a thermoplastic resin 114 of any one of the above-described compositions.

Step 304 of the method 300 may include at least partially curing or solidifying a plurality of particles such as polymer nanoparticles 200 (FIG. 4) for including in the resin 114 (FIG. 4). The polymer nanoparticles 200 may have a particle cross-sectional width 202 (FIG. 10) of from 10-200 nanometers. In other examples, the polymer nanoparticles 200 may have a particle cross-sectional width of from approximate 10 to 100 nm. However, the polymer nanoparticles 200 may have a particle cross-sectional width 202 of up to 2 microns. In some examples, the method may include fabricating the polymer nanoparticles 200 externally prior to mixing with the resin 114. In other examples, the polymer nanoparticles 200 may be formed in the resin 114 using at least one of the above-described forming techniques. The polymer nanoparticles 200 may be a solid sphere, a hollow sphere, or a core-sheath nanoparticle 206 including a sheath 208 encapsulating a core 210.

Step 306 of the method 300 may include mixing the plurality of polymer nanoparticles 200 with the resin 114 to form a resin mixture 118. Advantageously, due to the relatively small size (e.g., 10-200 nanometers) of the polymer nanoparticles 200 (FIG. 6) and the generally rounded or spherical shape, the polymer nanoparticles 200 may be mixed into the resin 114 (FIG. 6) at relatively high load levels with minimal impact on resin viscosity or resin flow. In one example, the polymer nanoparticles 200 may constitute up to 75 percent by volume of a resin mixture 118 (FIG. 6) containing resin 114 and polymer nanoparticles 200. Preferably, the polymer nanoparticles 200 may constitute a minimum of 10 percent by volume of a resin mixture 118 as the low end of a range of volumetric percentage of polymer nanoparticles 200. However, polymer nanoparticles 200 may be provided in any combination of the above-mentioned low end and high end of the range of volumetric percentage of polymer nanoparticles 200 of a resin mixture 118. For some applications, the polymer nanoparticles 200 may be substantially uniformly distributed throughout the resin 114. In other applications, the polymer nanoparticles 200 may be specifically placed at targeted locations within a composite layup 102. For example, the polymer nanoparticles 200 may be included in resin-rich pockets 132 (FIG. 6) associated with a composite structure 100 (FIG. 6), as indicated above. In other examples, the polymer nanoparticles 200 may be limited to the interlaminar regions 108 (FIG. 4) between one or more composite plies 106 (FIG. 4), or in other locations of a composite layup 102 (FIG. 4).

Step 308 of the method 300 may include at least partially embedding reinforcing fibers 120 (FIG. 6) in the resin mixture 118 (FIG. 6) prior to curing the resin mixture 118. The fibers 120 may be provided as fiber tows 120, unidirectional tape 124 (FIG. 4), woven fabric 126, braided fibers, or any one of a variety of other fiber forms. In some examples, the fiber forms may be pre-impregnated with resin 114 (FIG. 6) prior to forming and curing a composite layup 102 to form a composite structure 100. In other examples, the fibers 120 may be provided as dry fiber preforms 130 (FIG. 5) into which a resin mixture 118 containing polymer nanoparticles 200 (FIG. 6) may be infused or applied prior to curing the composite layup 102 (FIG. 6).

In some examples, the method may include applying polymer nanoparticles 200 to resin-rich pockets 132 (FIG. 6) of a composite layup 102. For example, during the process of laying up composite plies 106 formed of woven fabric 126, polymer nanoparticles may be selectively applied to resin-rich pockets 132 at the divots 128 and/or intersections of the fiber tows of the woven fabric 126. In an embodiment, a solution containing polymer nanoparticles 200 may be sprayed into resin-rich pockets 132 of one or more composite plies 106. Additionally, polymer nanoparticles 200 may be added systematically in a printed pattern (not shown) onto the reinforcing filaments 158 such that the content of the polymer nanoparticles 200 varies across a surface of the reinforcing filaments 158. The printed pattern may have the effect of altering one or more properties of a composite structure 100 containing the reinforcing filaments 158.

Step 310 of the method 300 may include curing the resin mixture 118 (FIG. 10) in a composite layup 102. Curing of the composite layup 102 (FIG. 4) may include the application of heat and/or pressure to reduce the viscosity of the resin 114 (FIG. 10) and allow the resin 114 to infuse the fibers 120 (FIG. 5) of the composite layup 102 (FIG. 4). The addition of the polymer nanoparticles 200 (FIG. 9) may improve the properties of the resin 114 and/or improve the manufacturability and/or performance of the composite structure 100 (FIG. 6), as described above.

In some examples, the method may include coupling a plurality of polymer nanoparticles 200 to one or more reinforcing filaments 122 (FIG. 10) to act as spacers to prevent the reinforcing filaments 122 from touching one another and to control the permeability of the fibers 120 (FIG. 6). The polymer nanoparticles 200 may be applied to reinforcing filaments 122 as the reinforcing filaments 122 are drawn from a fiber forming apparatus (not shown). In other examples, polymer nanoparticles 200 may be applied to reinforcing filaments 122 as the fiber tows 120 are formed into unidirectional tape, unidirectional sheet, woven fabric, braided fibers, and other fiber forms. Polymer nanoparticles 200 may also be coupled to or applied to one or more reinforcing filaments 122 during prepregging operations wherein resin 114 is applied to fiber tows, unidirectional tape, woven fabric, braided fibers, and other fiber forms.

In some examples, polymer nanoparticles 200 may be melt-fused to the reinforcing filaments 122. For example, the polymer nanoparticles 200 may be formed of thermoplastic material or the polymer nanoparticles 200 may be configured as core-sheath nanoparticles 206 each having a thermoplastic sheath 208 surrounding a core 210. The reinforcing filaments 122 and/or the sheaths 208 of the polymer nanoparticles may be heated to a temperature causing the outer portion of the core-sheath nanoparticles 206 to bond or melt-fuse to the reinforcing filaments 122 when the core-sheath nanoparticles 206 come into contact with the reinforcing filaments 122.

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composition, comprising:
   a resin;
   a plurality of non-elastomeric polymer nanoparticles included in the resin and forming a resin mixture, the non-elastomeric nanoparticles comprising non-elastomeric core-sheath polymer nanoparticles;
   the non-elastomeric core-sheath polymer nanoparticles consisting of a sheath encapsulating a core, the sheath consisting of polymeric material, the core consisting of at least one of polymeric material and glass.

2. The composition of claim 1, wherein the resin mixture has at least one of the following properties relative to resin that lacks the polymer nanoparticles:
   increased toughness, increased flammability resistance, increased electrical conductivity, reduced cure-shrinkage-related distortion, reduced heat-of-reaction-related distortion and reduced heat-of-reaction-related resin degradation.

3. The composition of claim 1, wherein:
   the resin mixture is included in a composite structure, a coating, an injection-molded plastic, and/or an adhesive.

4. The composition of claim 3, wherein:
   the composite structure includes reinforcing fibers at least partially embedded within the resin mixture; and
   the reinforcing fibers being in at least one of the following fiber configurations: fiber tows, unidirectional tape, woven fabric, and braided fiber.

5. The composition of claim 1, wherein the resin and/or the polymer nanoparticles are comprised of at least one of the following:
   thermoplastic material, acrylics, fluorocarbons, polyamides, polyolefins, polyesters, polycarbonates, polyurethanes, polyaryletherketones, polyetherimides, polyethersulfone, polysulfone, and polyphenylsulfone; and
   thermosetting material, polyurethanes, phenolics, polyimides, sulphonated polymer (polyphenylene sulphide), a conductive polymer (e.g., polyaniline), benzoxazines, bismaleimides, cyanate esthers, polyesters, epoxies, and silsesquioxanes.

6. The composition of claim 1, wherein:
some of the polymer nanoparticles are formed of a different material than other polymer nanoparticles.

7. The composition of claim 1, wherein:
the polymer nanoparticles constitute no less than 10 percent by volume of the resin mixture.

8. The composition of claim 1, wherein:
the polymer nanoparticles constitute up to 75 percent by volume of the resin mixture.

9. The composition of claim 1, wherein:
the polymer nanoparticles have a cross-sectional width of from approximately 10-200 nanometers.

10. The composition of claim 1, wherein:
the polymer nanoparticles have different particle sizes.

11. The composition of claim 1, wherein:
at least one of the polymer nanoparticles has at least one of the following configurations: a solid sphere and a hollow sphere.

12. The composition of claim 1, wherein:
the core has a non-spherical shape.

13. The composition of claim 1, wherein:
the core is formed of a different material than the sheath.

14. The composition of claim 1, wherein:
the sheath is soluble or partially soluble in the resin.

15. The composition of claim 1, wherein the polymer nanoparticles are formed by at least one of the following methods:
in-situ growth of the polymer nanoparticles; and
external fabrication of the polymer nanoparticles prior to addition of the polymer nanoparticles to the resin.

16. A composite structure, comprising:
a resin;
solidified non-elastomeric core-sheath polymer nanoparticles included in the resin to from a resin mixture; and
reinforcing fibers embedded within the resin mixture.

17. A method of forming a composition, comprising:
providing a resin;
at least partially curing or solidifying a plurality of non-elastomeric core-sheath polymer nanoparticles;
mixing the plurality of non-elastomeric polymer nanoparticles with the resin to form a resin mixture; and
curing the resin mixture.

18. The method of claim 17, wherein at least some of the polymer nanoparticles comprise:
polymer nanoparticles having a thermoset component; and
polymer nanoparticles formed of thermoplastic material.

19. The method of claim 17, further including:
forming the polymer nanoparticles externally prior to mixing with the resin.

20. The method of claim 17, further including:
at least partially embedding reinforcing fibers in the resin mixture prior to curing the resin mixture.

* * * * *

UNITED STATES PATENT AND TRADEMARK OFFICE
CERTIFICATE OF CORRECTION

PATENT NO.        : 9,862,828 B2                                   Page 1 of 1
APPLICATION NO.   : 14/493365
DATED             : January 9, 2018
INVENTOR(S)       : Mark S. Wilenski and Samuel J. Meure It is certified that error appears in the above-identified patent and that said Letters Patent is hereby corrected as shown below:

Column 18, Line 7:
Please replace "to from a resin mixture" with "to form a resin mixture"

Signed and Sealed this
First Day of May, 2018

Andrei Iancu
*Director of the United States Patent and Trademark Office*